(12) United States Patent
Wittkopp et al.

(10) Patent No.: US 8,496,558 B2
(45) Date of Patent: Jul. 30, 2013

(54) NINE SPEED AUTOMATIC TRANSMISSION

(75) Inventors: Scott H. Wittkopp, Ypsilanti, MI (US);
James M. Hart, Belleville, MI (US);
Elizabeth I. Wooden, Farmington Hills, MI (US); Daryl A. Wilton, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/313,827

(22) Filed: Dec. 7, 2011

(65) Prior Publication Data
US 2012/0178582 A1 Jul. 12, 2012

Related U.S. Application Data

(60) Provisional application No. 61/430,524, filed on Jan. 6, 2011.

(51) Int. Cl.
*F16H 3/62* (2006.01)

(52) U.S. Cl.
USPC ............................ 475/276; 475/278; 475/281

(58) Field of Classification Search
USPC ........................................ 475/276–281, 296
See application file for complete search history.

(56) References Cited

U.S. PATENT DOCUMENTS

| | | | | |
|---|---|---|---|---|
| 3,956,946 | A | * | 5/1976 | Murakami et al. ............ 475/276 |
| 3,999,448 | A | * | 12/1976 | Murakami et al. ............ 475/276 |
| 6,176,803 | B1 | | 1/2001 | Meyer et al. |
| 6,984,187 | B2 | | 1/2006 | Biermann |
| 6,991,578 | B2 | | 1/2006 | Ziemer |
| 7,011,597 | B2 | | 3/2006 | Haka |
| 7,018,319 | B2 | | 3/2006 | Ziemer |
| 7,128,683 | B2 | * | 10/2006 | Oguri et al. ................... 475/276 |
| 7,608,008 | B2 | * | 10/2009 | Seo ................................ 475/276 |
| 2005/0221958 | A1 | * | 10/2005 | Lee et al. ...................... 477/167 |
| 2006/0166779 | A1 | * | 7/2006 | Klemen ......................... 475/280 |
| 2010/0170764 | A1 | * | 7/2010 | Harashima et al. ........ 192/70.12 |

* cited by examiner

*Primary Examiner* — Justin Holmes
*Assistant Examiner* — Huan Le

(57) ABSTRACT

A transmission includes an input member, an output member, four planetary gear sets, a plurality of coupling members and a plurality of torque transmitting devices. The transmission input member is connected to a dry launch clutch. Each of the planetary gear sets includes first, second and third members. The torque transmitting devices are for example clutches and brakes.

20 Claims, 4 Drawing Sheets

| Gear State | Gear Ratio | Ratio Step | 30 | 32 | 34 | 36 | 26 | 28 |
|---|---|---|---|---|---|---|---|---|
| Rev | -5.550 |  |  |  | X |  | X |  |  |
| N |  | -0.96 |  |  |  | O |  |  |
| 1st | 5.767 |  |  | X |  | X |  |  |
| 2nd | 3.461 | 1.67 |  |  |  | X |  | X |
| 3rd | 2.437 | 1.42 |  | X |  |  |  | X |
| 4th | 1.687 | 1.44 |  |  | X |  |  | X |
| 5th | 1.278 | 1.32 | X |  |  |  |  | X |
| 6th | 1.000 | 1.28 |  |  |  |  | X | X |
| 7th | 0.828 | 1.21 | X |  |  |  | X |  |
| 8th | 0.721 | 1.15 |  |  | X |  | X |  |
| 9th | 0.614 | 1.13 |  | X |  |  | X |  |

NINE SPEED AUTOMATIC TRANSMISSION

CROSS-REFERENCE

This application claims the benefit of U.S. Provisional Application No. 61/430,524, filed Jan. 6, 2011. The entire contents of the above application are incorporated herein by reference

FIELD

The invention relates generally to a nine speed transmission having a plurality of planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. The transmission input member is connected to a dry launch clutch. Each of the planetary gear sets includes first, second and third members. The torque transmitting devices are low loss clutches and brakes.

For example, in one embodiment a multispeed transmission is provided. The transmission includes an input member, an output member, and first, second, third, and fourth planetary gear sets each having a first, a second, and a third member, wherein the second member of the first planetary gear set is connected with the second member of the second planetary gear set, the third member of the first planetary gear set is connected with the third member of the second planetary gear set and the first member of the third planetary gear set, the second member of the third planetary gear set is connected with the second member of the fourth planetary gear set, and the third member of the third planetary gear set is connected with the third member of the fourth planetary gear set. A first clutch selectively connects the first member of the second planetary gear set with the third members of the third and fourth planetary gear sets. A second clutch selectively connects the first member of the second planetary gear set with the first member of the fourth planetary gear set. A first brake selectively connects the first member of the first planetary gear set with a stationary member. A second brake selectively connects the second members of the first and second planetary gear sets with the stationary member. A third brake selectively connects the first member of the third planetary gear set and the third members of the first and second planetary gear sets with the stationary member. A fourth brake selectively connects the third members of the third and fourth planetary gear sets with the stationary member, wherein the fourth brake is a selectable one-way brake. The clutches and brakes are selectively engageable in combinations of at least two to produce a plurality of forward speed ratios between the input member and the output member.

In another embodiment, the first clutch is selectively engageable by selective translation of a first rotationally fixed piston slidably disposed within a first cylinder.

In yet another embodiment, the transmission includes a first thrust bearing disposed between the first piston and a first apply plate, wherein translation of the first rotationally fixed piston acts on the first thrust bearing to engage the first apply plate to activate the first clutch.

In yet another embodiment, the second clutch is selectively engageable by selective translation of a second rotationally fixed piston slidably disposed within a second cylinder.

In yet another embodiment, the transmission includes a second thrust bearing disposed between the second piston and a second apply plate, wherein translation of the second rotationally fixed piston acts on the second thrust bearing to engage the second apply plate to activate the second clutch.

In yet another embodiment, the first, second, and third brakes are band brakes.

In yet another embodiment, the first clutch includes a first member having a first set of discs slidably disposed on the first member and having a second member with a second set of discs slidably disposed on the second member and interleaved with the first set of discs, wherein the first member is selectively connectable with the first member of the second planetary gear set or with the third members of the third and fourth planetary gear sets.

In yet another embodiment, the first clutch is selectively engageable by selective translation of an apply plate, and wherein translation of the apply plate contacts the first member to connect the first member with the first member of the second planetary gear set or with the third members of the third and fourth planetary gear sets and wherein further translation of the apply plate compresses the first and second set of discs together to engage the first clutch.

In yet another embodiment, the input member is connected for common rotation with the first member of the second planetary gear set.

In yet another embodiment, the output member is connected for common rotation with the second member of the third planetary gear set and the second member of the fourth planetary gear set.

In yet another embodiment, a launch clutch is connected to the input member.

In yet another embodiment, the first members of the first, second, third, and fourth planetary gear sets are sun gears, the second members of the first, second, and third planetary gear sets and the third member of the fourth planetary gear set are ring gears, and the third members of the first, second, and third planetary gear sets and the second member of the fourth planetary gear set are carrier members.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
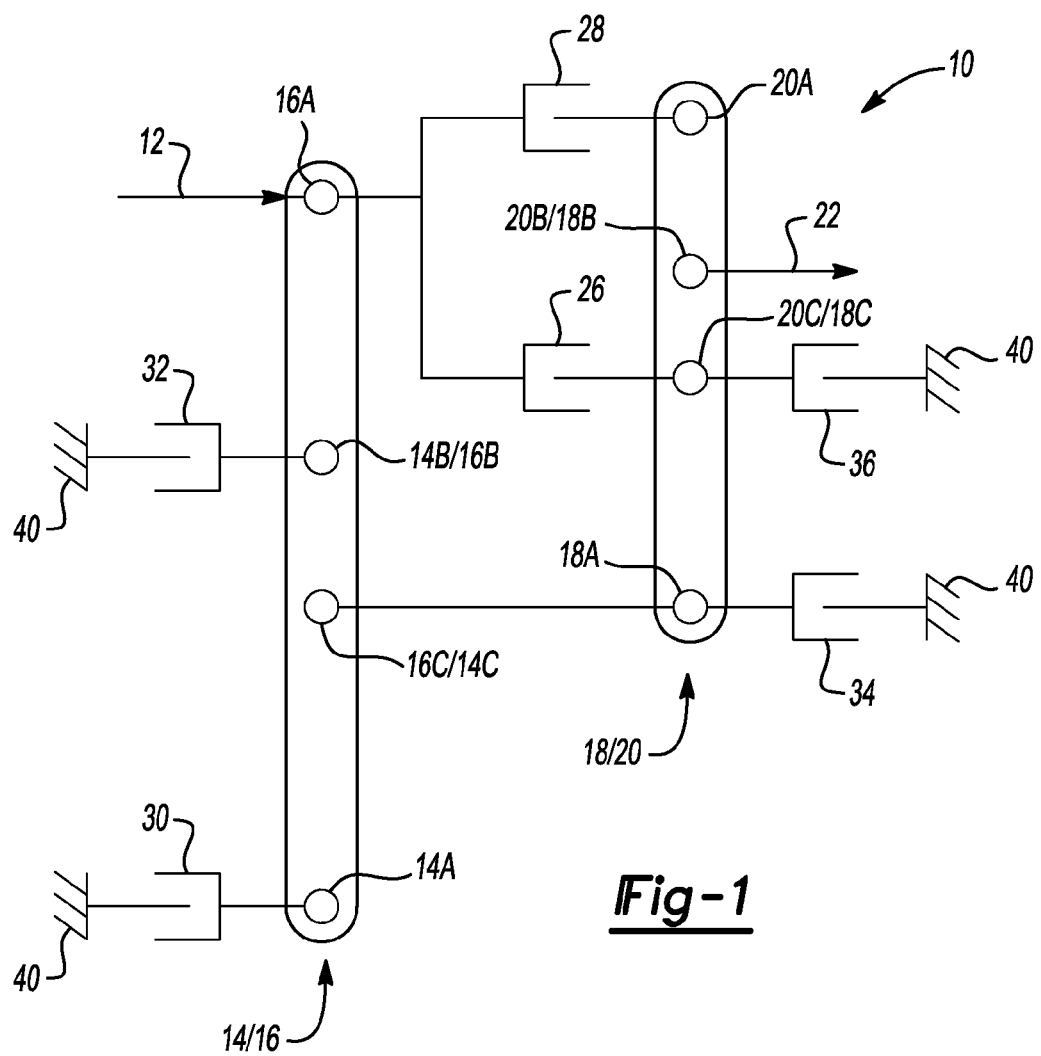
FIG. 1 is a lever diagram of an embodiment of a nine speed transmission according to the present invention.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the first node 16A of the second planetary gear set 16. The output member 22 is coupled to the second node 18B of the third planetary gear set 18 and the second node 20B of the fourth planetary gear set 20. The second node 14B of the first planetary gear set 14 is coupled to the second node 16B of the second planetary gear set 16. The third node 14C of the first planetary gear set 14 is coupled to the third node 16C of the second planetary gear set 16 and the first node 18A of the third planetary gear set 18. The second node 18B of the third planetary gear set 18 is coupled to the second node 20B of the fourth planetary gear set 20. The third node 18C of the third planetary gear set 18 is coupled to the third node 20C of the fourth planetary gear set 20.

A first clutch 26 selectively connects the first node 16A of the second planetary gear set 16 and the input member 12 with the third node 18C of the third planetary gear set 18 and the third node 20C of the fourth planetary gear set 20. A second clutch 28 selectively connects the first node 16A of the second planetary gear set 16 and the input member 12 with the first node 20A of the fourth planetary gear set 20. A first brake 30 selectively connects the first node 14A of the first planetary gear set 14 to a stationary member or a transmission housing 40. A second brake 32 selectively connects the second node 14B of the first planetary gear set 14 and the second node 16B of the second planetary gear set 16 to a stationary member or transmission housing 40. A third brake 34 selectively connects the third node 14C of the first planetary gear set, the third node 16C of the second planetary gear set 16, and the first node 18A of the third planetary gear set 18 to the stationary member or transmission housing 40. A fourth brake 36 selectively connects the third node 18C of the third planetary gear set 18 and the third node 20C of the fourth planetary gear set 20 to the stationary member or transmission housing 40.

Figures 2, 3:
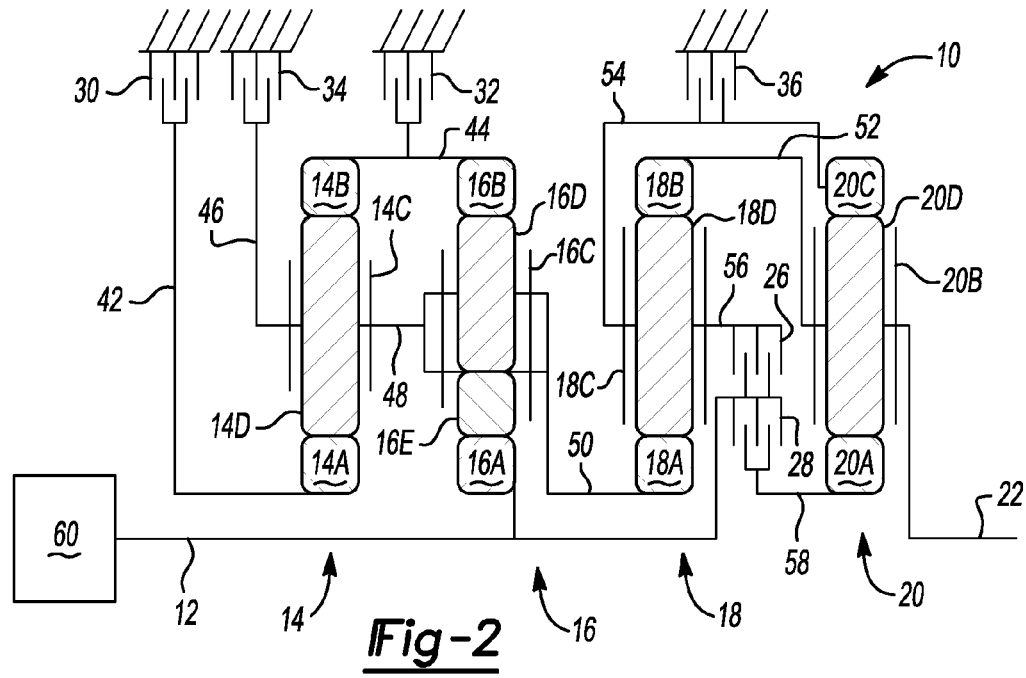
FIG. 2 is a diagrammatic view of an embodiment of a nine speed transmission according to the present invention.
FIG. 3 is a truth table presenting the state of engagement of the various torque transmitting elements in each of the available forward and reverse speeds or gear ratios of the transmission illustrated in FIGS. 1 and 2.

Referring now to FIG. 2, a stick diagram presents a schematic layout of the embodiment of the nine speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a planet gear carrier member 14C and a ring gear member 14B. The sun gear member 14A is connected for common rotation with a first shaft or interconnecting member 42. The ring gear member 14B is connected for common rotation with a second shaft or interconnecting member 44. The planet gear carrier member 14C rotatably supports a set of planet gears 14D (only one of which is shown) and is connected for common rotation with a third shaft or interconnecting member 46 and a fourth shaft or interconnecting member 48. The planet gears 14D are each configured to intermesh with both the sun gear member 14A and the ring gear member 14B.

The second planetary gear set 16 includes a sun gear member 16A, a planet carrier member 16C that rotatably supports a set of planet gears 16D and 16E, and a ring gear member 16B. The sun gear member 16A is connected for common rotation with the input member 12. The ring gear member 16B is connected for common rotation with the second shaft or interconnecting member 44. The planet carrier member 16C is connected for common rotation with the fourth shaft or interconnecting member 48 and a fifth shaft or interconnecting member 50. The planet gears 16D are each configured to intermesh with both the ring gear member 16B and the planet gears 16E. The planet gears 16E are each configured to intermesh with both the planet gears 16D and the sun gear 16A.

The third planetary gear set 18 includes a sun gear member 18A, a ring gear member 18B and a planet carrier member 18C that rotatably supports a set of planet gears 18D. The sun gear member 18A is connected for common rotation with the fifth interconnecting member 50. The ring gear member 18B is connected for common rotation with a sixth shaft or interconnecting member 52. The planet carrier member 18C is connected for common rotation with a seventh shaft or interconnecting member 54 and with an eighth shaft or interconnecting member 56. The planet gears 18D are each configured to intermesh with both the sun gear member 18A and the ring gear member 18B.

The fourth planetary gear set 20 includes a sun gear member 20A, a ring gear member 20C and a planet carrier member 20B that rotatably supports a set of planet gears 20D. The sun gear member 20A is connected for common rotation with a ninth shaft or interconnecting member 58. The ring gear member 20C is connected for common rotation with the seventh interconnecting member 54. The planet carrier member 20B is connected for common rotation with the sixth interconnecting member 52 and with the output member 22. The planet gears 20D are each configured to intermesh with both the sun gear member 20A and the ring gear member 20C.

The input shaft or member 12 is continuously connected to a dry clutch launch device 60. The dry clutch launch device 60 is selectively connected to an engine or other prime mover (not shown). The output shaft or member 22 is preferably continuously connected with the final drive unit or transfer case (not shown).

The torque-transmitting mechanisms or clutches 26, 28 and brakes 30, 32, 34, 36 allow for selective interconnection of the shafts or interconnecting members, members of the planetary gear sets and the housing. For example, the first clutch 26 is selectively engageable to connect the eighth interconnecting member 56 with the input member 12. The second clutch 28 is selectively engageable to connect the ninth interconnecting member 58 with the input member 12. The first brake 30 is selectively engageable to connect the first interconnecting member 42 to the stationary member or transmission housing 40 in order to restrict the sun gear member 14A of the first planetary gear set 14 from rotating relative to the stationary member or transmission housing 40. The second brake 32 is selectively engageable to connect the second interconnecting member 44 to the stationary member or transmission housing 40 in order to restrict the ring gear member 14B of the first planetary gear set 14 and the ring gear member 16B of the second planetary gear set 16 from rotating relative to the stationary member or transmission housing 40. The third brake 34 is selectively engageable to connect the third interconnecting member 46 to the stationary member or transmission housing 40 in order to restrict the planet carrier member 14C of the first planetary gear set 14, the planet carrier member 16C of the second planetary gear set 16, and the sun gear 18A of the third planetary gear set 18 from rotating relative to the stationary member or transmission housing 40. The fourth brake 36 is selectively engageable to connect the seventh interconnecting member 54 to the stationary member or transmission housing 40 in order to restrict the planet carrier member 18C of the third planetary gear set 18 and the ring gear member 20C of the fourth planetary gear set 20 from rotating relative to the stationary element or transmission housing 40.

Referring now to FIGS. 2 and 3, the operation of the embodiment of the nine speed transmission 10 will be described. It will be appreciated that the transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34, and fourth brake 36), as will be explained below. FIG. 3 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first brake 30 and the fourth brake 36 are engaged or activated. The first brake 30 connects the first interconnecting member 42 to the stationary member or transmission housing 40 in order to restrict the sun gear member 14A of the first planetary gear set 14 from rotating relative to the stationary member or transmission housing 40. The fourth brake 36 connects the seventh interconnecting member 54 to the stationary member or transmission housing 40 in order to restrict the planet carrier member 18C of the third planetary gear set 18 and the ring gear member 20C of the fourth planetary gear set 20 from rotating relative to the stationary element or transmission housing 40. Likewise, the nine forward ratios are achieved through different combinations of clutch and brake engagement, as shown in FIG. 3.

The brakes 30, 32, and 34 are engaged or applied via plate clutches or friction bands. In addition, the brake 36 is preferably a selectable one-way clutch.

Figure 4:
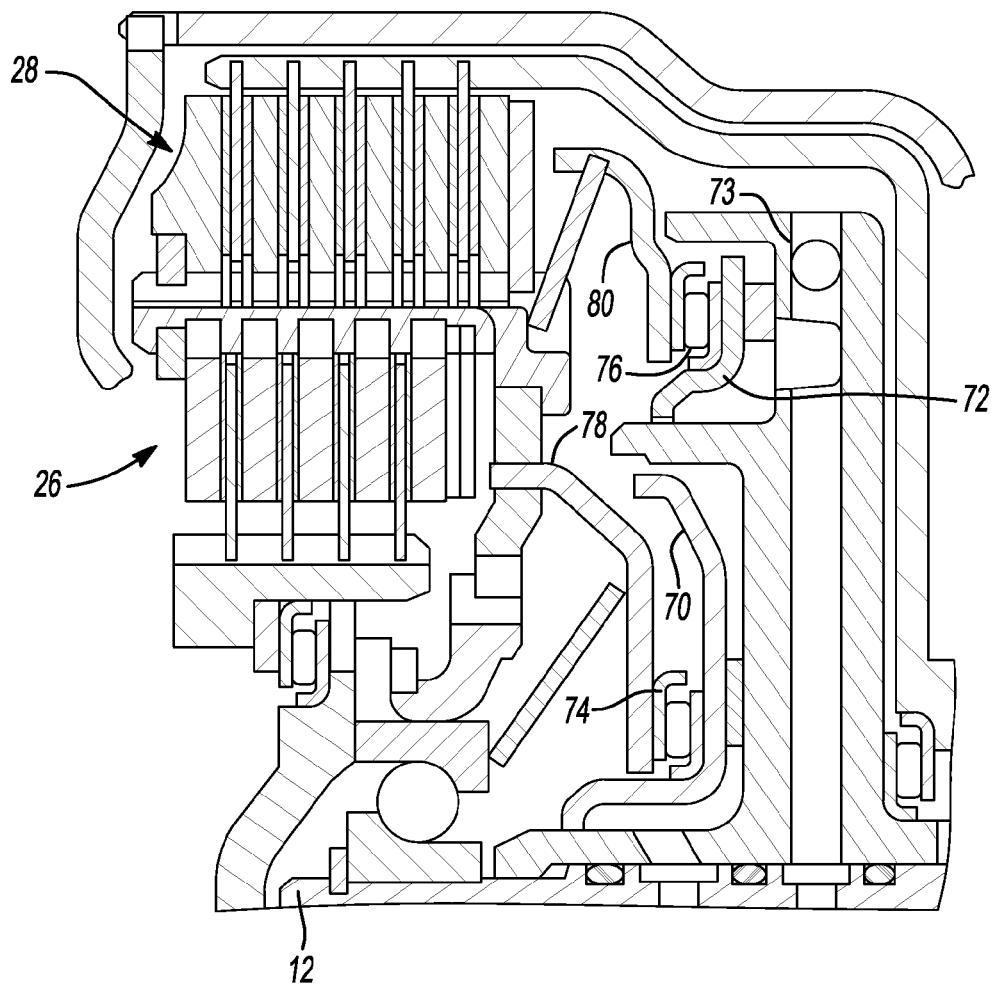
FIG. 4 is a partial cross section of an embodiment of a nine speed transmission according to the present invention.

Turning to FIG. 4, a partial cross-section illustrating one embodiment of the transmission 10 is illustrated. The clutches 26 and 28 are actuated or applied using stationary (i.e. non-rotating) pistons 70 and 72, respectively. The pistons 70, 72 are housed within a non-rotating housing member 73. A pair of annular bearings 74 and 76 are disposed between the pistons 70 and 72 and respective apply plates 78 and 80. The bearings 74, 76 are translated by the pistons 70, 72 to contact the apply plates 78 and 80, respectively, which engage the clutches 26 and 28.

Figure 5:
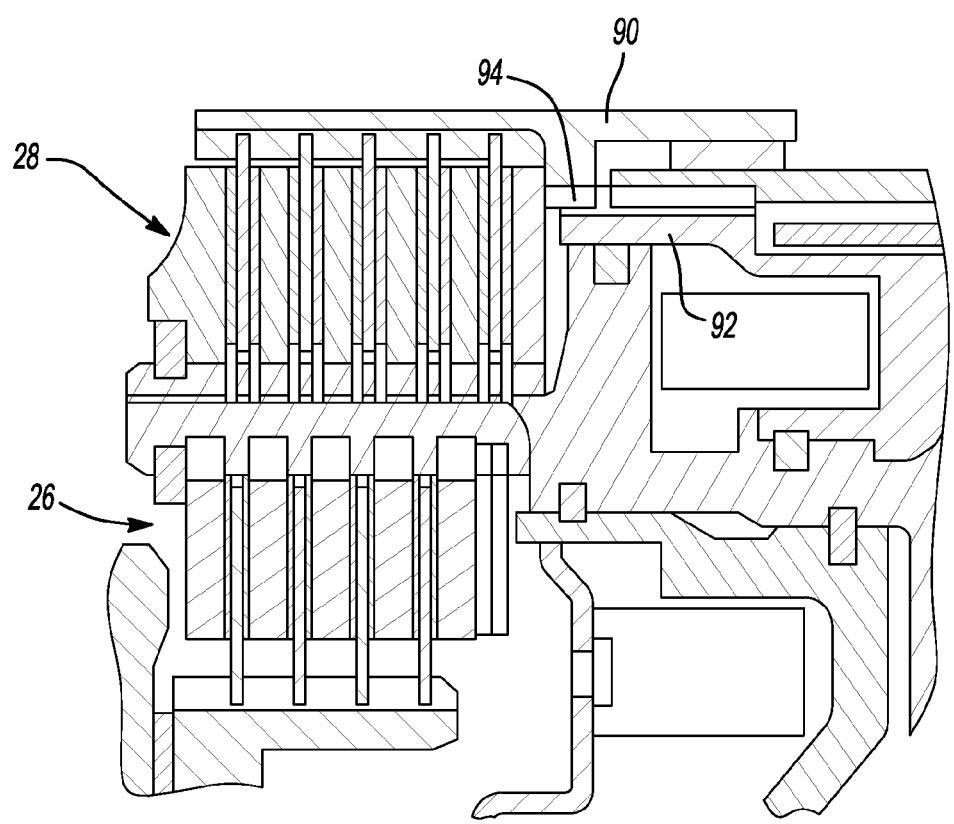
FIG. 5 is a partial cross section of an alternate embodiment of a nine speed transmission according to the present invention.

Turning to FIG. 5, a partial cross-section illustrating another embodiment of the transmission 10 is illustrated. In this embodiment, the clutch 28 includes a disconnect housing 90. The disconnect housing 90 is disengaged from the member 58 and the sun gear member 20A of the fourth planetary gear set. An apply piston 92 is hydraulically actuatable to engage the disconnect housing 90 via features 94 on an outer surface of the apply piston 92 and complimentary splines 96 located on an inner surface of the disconnect housing 90. The translation of the apply piston 92 connects the housing 90 of the clutch 28 with the member 8 and the sun gear 20A of the fourth planetary gear set. Further translation of the apply piston 92 engages the clutch 28. Alternatively, the clutch 26 may include a disconnect housing or hub.

The description of the invention is merely exemplary in nature and variations that do not depart from the gist of the invention are intended to be within the scope of the invention. Such variations are not to be regarded as a departure from the spirit and scope of the invention.

The following is claimed:

1. A multispeed transmission comprising:
an input member;
an output member;
first, second, third, and fourth planetary gear sets each having a first, a second, and a third member, wherein the second member of the first planetary gear set is connected directly with the second member of the second planetary gear set, the third member of the first planetary gear set is connected directly with the third member of the second planetary gear set and the first member of the third planetary gear set, the second member of the third planetary gear set is connected directly with the second member of the fourth planetary gear set, and the third member of the third planetary gear set is connected directly with the third member of the fourth planetary gear set;

a first clutch for selectively connecting the first member of the second planetary gear set with the third members of the third and fourth planetary gear sets;

a second clutch for selectively connecting the first member of the second planetary gear set with the first member of the fourth planetary gear set;

a first brake for selectively connecting the first member of the first planetary gear set with a stationary member;

a second brake for selectively connecting the second members of the first and second planetary gear sets with the stationary member;

a third brake for selectively connecting the first member of the third planetary gear set and the third members of the first and second planetary gear sets with the stationary member; and a fourth brake for selectively connecting the third members of the third and fourth planetary gear sets with the stationary member, wherein the fourth brake is a selectable one-way clutch, and wherein the clutches and brakes are selectively engageable in combinations of at least two to produce a plurality of forward speed ratios between the input member and the output member.

2. The transmission of claim 1 wherein the first, second, and third brakes are band brakes.

3. The transmission of claim 1 wherein the input member is connected for common rotation with the first member of the second planetary gear set.

4. The transmission of claim 1 wherein the output member is connected for common rotation with the second member of the third planetary gear set and the second member of the fourth planetary gear set.

5. The transmission of claim 1 further comprising a launch clutch connected to the input member.

6. The transmission of claim 1 wherein the first members of the first, second, third, and fourth planetary gear sets are sun gears, the second members of the first, second, and third planetary gear sets and the third member of the fourth planetary gear set are ring gears, and the third members of the first, second, and third planetary gear sets and the second member of the fourth planetary gear set are carrier members.

7. The transmission of claim 1 wherein the first clutch includes a first member having a first set of discs slidably disposed on the first member and having a second member with a second set of discs slidably disposed on the second member and interleaved with the first set of discs, wherein the first member is selectively connectable with the first member of the second planetary gear set or with the third members of the third and fourth planetary gear sets.

8. The transmission of claim 7 wherein the first clutch is selectively engageable by selective translation of an apply plate, and wherein translation of the apply plate contacts the first member to connect the first member with the first member of the second planetary gear set or with the third members of the third and fourth planetary gear sets and wherein further translation of the apply plate compresses the first and second set of discs together to engage the first clutch.

9. The transmission of claim 1 wherein the first clutch is selectively engageable by selective translation of a first rotationally fixed piston slidably disposed within a first cylinder.

10. The transmission of claim 9 further comprising a first thrust bearing disposed between the first piston and a first apply plate, wherein translation of the first rotationally fixed piston acts on the first thrust bearing to engage the first apply plate to activate the first clutch.

11. The transmission of claim 10 wherein the second clutch is selectively engageable by selective translation of a second rotationally fixed piston slidably disposed within a second cylinder.

12. The transmission of claim 11 further comprising a second thrust bearing disposed between the second piston and a second apply plate, wherein translation of the second rotationally fixed piston acts on the second thrust bearing to engage the second apply plate to activate the second clutch.

13. A multispeed transmission comprising:

an input member;

an output member;

first, second, third, and fourth planetary gear sets each having a first, a second, and a third member, wherein the second member of the first planetary gear set is connected directly with the second member of the second planetary gear set, the third member of the first planetary gear set is connected directly with the third member of the second planetary gear set and the first member of the third planetary gear set, the second member of the third planetary gear set is connected directly with the second member of the fourth planetary gear set, and the third member of the third planetary gear set is connected directly with the third member of the fourth planetary gear set;

a first clutch for selectively connecting the first member of the second planetary gear set with the third members of the third and fourth planetary gear sets, wherein the first clutch includes a first member having a first set of discs slidably disposed on the first member and having a second member with a second set of discs slidably disposed on the second member and interleaved with the first set of discs, wherein the first member is selectively connectable with the first member of the second planetary gear set or with the third members of the third and fourth planetary gear sets;

a first clutch actuator including a translatable apply plate, wherein translation of the apply plate contacts the first member to connect the first member with the first member of the second planetary gear set or with the third members of the third and fourth planetary gear sets and wherein further translation of the apply plate compresses the first and second set of discs together to engage the first clutch;

a second clutch for selectively connecting the first member of the second planetary gear set with the first member of the fourth planetary gear set;

a first brake for selectively connecting the first member of the first planetary gear set with a stationary member;

a second brake for selectively connecting the second members of the first and second planetary gear sets with the stationary member;

a third brake for selectively connecting the first member of the third planetary gear set and the third members of the first and second planetary gear sets with the stationary member; and a fourth brake for selectively connecting the third members of the third and fourth planetary gear sets with the stationary member, and wherein the clutches and brakes are selectively engageable in combinations of at least two to produce a plurality of forward speed ratios between the input member and the output member.

14. The transmission of claim 13 wherein the fourth brake is a selectable one-way clutch.

15. The transmission of claim 13 wherein the first, second, and third brakes are band brakes.

16. The transmission of claim 13 wherein the input member is connected for common rotation with the first member of the second planetary gear set.

17. The transmission of claim 13 wherein the output member is connected for common rotation with the second member of the third planetary gear set and the second member of the fourth planetary gear set.

18. The transmission of claim 13 further comprising a launch clutch connected to the input member.

19. The transmission of claim 13 wherein the first members of the first, second, third, and fourth planetary gear sets are sun gears, the second members of the first, second, and third planetary gear sets and the third member of the fourth planetary gear set are ring gears, and the third members of the first, second, and third planetary gear sets and the second member of the fourth planetary gear set are carrier members.

20. A multispeed transmission comprising:
an input member;
an output member;
first, second, third, and fourth planetary gear sets each having a first, a second, and a third member, wherein the second member of the first planetary gear set is connected directly with the second member of the second planetary gear set, the third member of the first planetary gear set is connected directly with the third member of the second planetary gear set and the first member of the third planetary gear set, the second member of the third planetary gear set is connected directly with the second member of the fourth planetary gear set, and the third member of the third planetary gear set is connected directly with the third member of the fourth planetary gear set;
a first clutch for selectively connecting the first member of the second planetary gear set with the third members of the third and fourth planetary gear sets;
a second clutch for selectively connecting the first member of the second planetary gear set with the first member of the fourth planetary gear set, wherein the second clutch includes a first member having a first set of discs slidably disposed on the first member and having a second member with a second set of discs slidably disposed on the second member and interleaved with the first set of discs, wherein the first member is selectively connectable with the first member of the second planetary gear set or the first member of the fourth planetary gear set;
a second clutch actuator including a translatable apply plate, wherein translation of the apply plate contacts the first member to connect the first member with the first member of the second planetary gear set or with the first member of the fourth planetary gear set and wherein further translation of the apply plate compresses the first and second set of discs together to engage the second clutch;
a first brake for selectively connecting the first member of the first planetary gear set with a stationary member;
a second brake for selectively connecting the second members of the first and second planetary gear sets with the stationary member;
a third brake for selectively connecting the first member of the third planetary gear set and the third members of the first and second planetary gear sets with the stationary member; and
a fourth brake for selectively connecting the third members of the third and fourth planetary gear sets with the stationary member, and
wherein the clutches and brakes are selectively engageable in combinations of at least two to produce a plurality of forward speed ratios between the input member and the output member.

* * * * *